United States Patent [19]

Traynor

[11] 3,867,500

[45] Feb. 18, 1975

[54] POLYAMIDE-IMIDE FILM INSULATION HAVING IMPROVED ELONGATION AND FOLD ENDURANCE

[75] Inventor: Edward J. Traynor, Bedford, Pa.

[73] Assignee: Westinghouse Electric Corporation, Pittsburgh, Pa.

[22] Filed: June 6, 1973

[21] Appl. No.: 367,658

Related U.S. Application Data

[63] Continuation-in-part of Ser. No. 158,522, June 30, 1971, abandoned.

[52] U.S. Cl.......... 264/216, 260/47 CP, 260/78 TF, 264/236, 264/288, 264/331
[51] Int. Cl............................................. C08g 20/32
[58] Field of Search........ 264/204, 205, 210 R, 216, 264/236, 212, 331, 288 R; 260/78 TF, 47 CP

[56] References Cited
UNITED STATES PATENTS

| | | | |
|---|---|---|---|
| 3,428,602 | 2/1969 | Haller | 264/331 |
| 3,502,762 | 3/1970 | Haller | 260/78 TF |
| 3,619,461 | 11/1971 | Gay | 264/288 |
| 3,792,019 | 2/1974 | Gattus et al. | 260/78 TF |

Primary Examiner—Jeffery R. Thurlow
Attorney, Agent, or Firm—D. P. Cillo

[57] ABSTRACT

A heavy gauge, high temperature polyimide and polyamide-imide insulating film having a high fold endurance is made by: (1) depositing a solvent solution of a soluble polyamide precursor as a wet film on a substrate directly followed by (2) initially heating the wet film-substrate composite at a temperature of between about 80°C and 110°C, to partially remove solvent and water and form a tack free film-substrate composite directly followed by (3) heating the film-substrate composite to a temperature of at least about 130°C to further dry and semi-cure the film directly followed by (4) stripping the low solvent film from the substrate directly followed by (5) heating the stripped film at a temperature between about 200°C and 350°C and simultaneously stretching the film up to about 150 percent of its original length, to provide a solid, cured, stretched film.

13 Claims, No Drawings

POLYAMIDE-IMIDE FILM INSULATION HAVING IMPROVED ELONGATION AND FOLD ENDURANCE

CROSS REFERENCE TO RELATED APPLICATIONS

The present application is a continuation-in-part of application Ser. No. 158,522, filed June 30, 1971, now abandoned.

BACKGROUND OF THE INVENTION

Many imide and amide-imide polymers have been synthesized, but their fabrication as heavy gauge films having a thickness between 2 to 10 mils has always required a multiple pass operation to build up film layers.

SUMMARY OF THE INVENTION

My invention relates to a new and improved method of preparing polyamide-imide polymer films which have improved fold endurance and elongation. These films are especially useful as traction motor insulation. My method overcomes prior art difficulties in successfully casting these polymers as films of 2 to 10 mil thickness in a single pass operation, thus eliminating a large production line and providing considerable savings.

The single pass, heavy gauge films are made by first applying a polyamic acid solution as a single, wet, precursor layer on a substrate. This is followed by an initial heating step, to remove a large percentage of the solvent from the cast precursor layer, at temperatures between 80° and 110°C, preferably in a non-circulating oven at a relative humidity up to about 60 percent. Conversion to the solid amide-imide film then proceeds rapidly by curing at temperatures between about 130° and 350°C to remove the rest of the solvent and condensation water. The film is sufficiently dry at about 130° to 150°C to be stripped from the substrate by hand or other suitable means, and while final curing, the stripped film is stretched between 0.5 and 150 percent but preferably between 5 and 125 percent of its original length, at temperatures between about 200° and 350°C. This stretching orients the film to a certain degree, reduces the amount of amorphous material and thus improves the film's fold endurance and elongation.

DESCRIPTION OF THE PREFERRED EMBODIMENTS

One of the imide and amide-imide films, cast from solutions in accordance with this invention, comprises polymers of aromatic polyimides or aromatic polyamide-imides having the recurring unit:

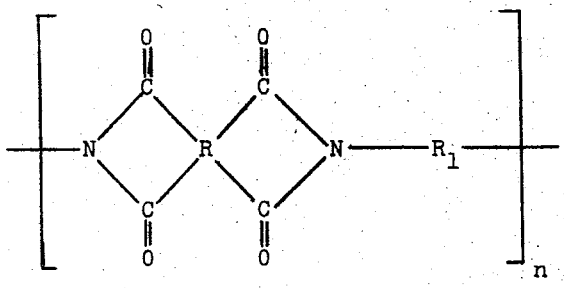

wherein $n$ is at least 15, R is at least one tetravalent organic radical selected from the group consisting of:

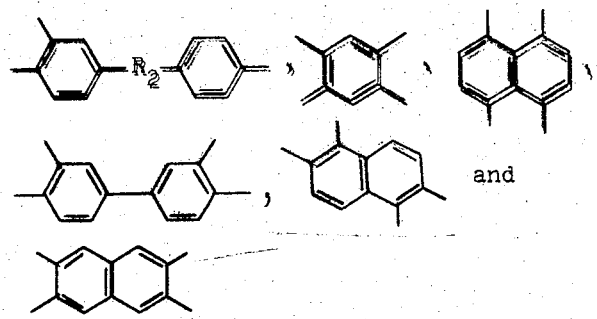

$R_2$ being selected from the group consisting of divalent aliphatic hydrocarbon radicals having from one to four carbon atoms and carbonyl, oxy, sulfo and sulfonyl radicals and in which $R_1$ is at least one divalent radical selected from the group consisting of:

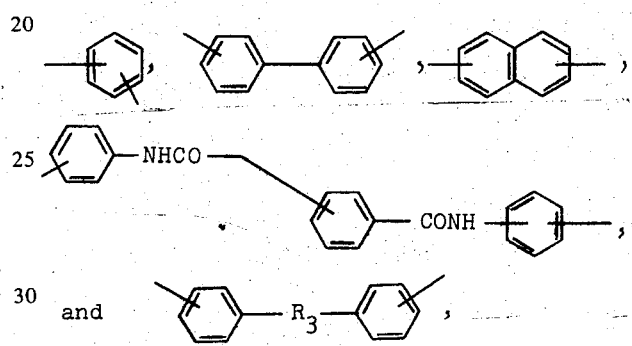

in which $R_3$ is a divalent organic radical selected from the group consisting of $R_2$, silico and amido radicals. Polymers containing two or more of the R and/or $R_1$ radicals, especially multiple series of $R_1$ containing amido radicals, are particularly valuable in some instances.

The aromatic polyamide-imide resins, represented by certain of the foregoing formulae are described and claimed in U.S. Pat. No. 3,179,635, assigned to the assignee of this invention, and reference may be made thereto for details on the methods of preparing those resins. For additional details reference may also be made to an article by Frost and Bower, entitled "Aromatic Polyimides" in *J. Polymer Science*, Part A, Vol. 1, pp. 3135–3150 (1963). Reference may be had to U.S. Pat. Nos. 3,179,631; 3,179,632; 3,179,633 and 3,179,634 for details on preparing aromatic polyimide resins.

The described essentially insoluble solid resinous films are derived from certain soluble aromatic polyamic acids in solvent solution. The wet film after being cast or otherwise applied to a suitable substrate is heated to drive off the solvent and to cure the precursor film to its solid resinous state.

In general, the soluble polyamic acid precursors are prepared by admixing a suitable aromatic tetracarboxylic dianhydride with an aromatic diamine in a suitable solvent at room temperature. The admixture or solution is stirred until a maximum viscosity is reached. Examples of suitable dianhydrides are pyromellitic dianhydride, benzophenone tetracarboxylic dianhydride naphthalene tetracarboxylic dianhydride and the like.

Examples of suitable diamines are m-phenylene diamine methylene dianiline, diaminodiphenyl ether, diaminobenzanilide and the like. References which describe the procedure in greater detail are U.S. Pat. No. 3,179,635, assigned to the assignee of this invention, and U.S. Pat. Nos. 3,179,614; 3,179,631; 3,179,632; 3,179,633 and 3,179,634.

The same general procedure is employed when a derivative of an aromatic tricarboxylic anhydride, e.g. trimellitic anhydride chloride or the ester diacid chlorine of trimellitic anhydride is used in place of the aforesaid aromatic dianhydride. The above-named diamines are, of course, also suitable for use with the tricarboxylic anhydride derivatives.

One of the aromatic polyamic acids suitable for use as a soluble polyamide precursor in this invention has the recurring unit:

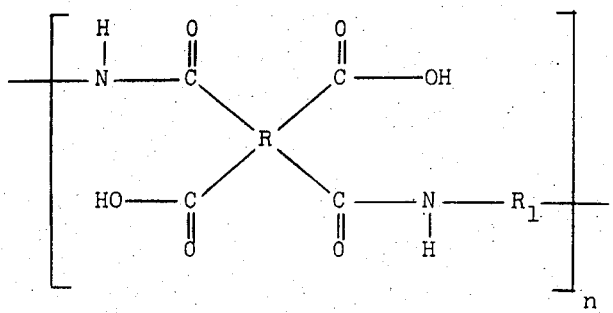

in which $n$ is at least 15 and R and $R_1$ are identical to the description hereinabove relating to the solid aromatic polyimide and polyamide-imide resins. It should be understood that suitable polyamic acids may also contain two or more of the R and/or $R_1$ radicals.

Suitable solvents for the aromatic polyamic acids are, for example, the normally liquid organic solvents of the N,N-dialkylcarboxylamide class, preferably the lower molecular weight members of this class. Typical examples include dimethyl acetamide, dimethyl formamide, N-methyl pyrrolidon, as well as dimethyl sulfoxide and pyridine. The solvents can be used individually, in combinations of two or more, or in combination with other liquid organic solvents such for example, as xylene, toluene, benzene, benzonitrile, dioxane, butyrolactone, and cyclohexane. The solvents are easily removed by heating in a drying tower or oven, so that the condensation reaction which takes place in converting the polyamic acid precursors to the solid resin may be immediately initiated in the heated curing tower. The precursor solutions are all highly viscous and rather low polyamic acid solids concentrations, up to about 35 percent by weight, are recommended if reasonably fluid solutions are desired for casting purposes. This will provide precursor solutions having viscosities between about 600–7,000 centipoise.

In addition to the aforementioned aromatic polyimide and polyamide-imide recurring unit wherein R was a tetravalent organic radical, other resins which are particularly suitable as films which can be cast from solutions in accordance with this invention are derived from a trivalent anhydride and have the structure:

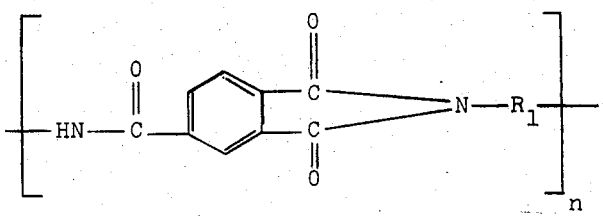

wherein $R_1$ and n are identical to the description hereinabove relating to the solid aromatic polyimide and polyamideimide resins.

Particularly valuable films are provided when $R_1$ is

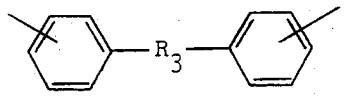

where $R_3$ is an oxy or methylene ($-CH_2-$) radical. This resin may have the recurring unit:

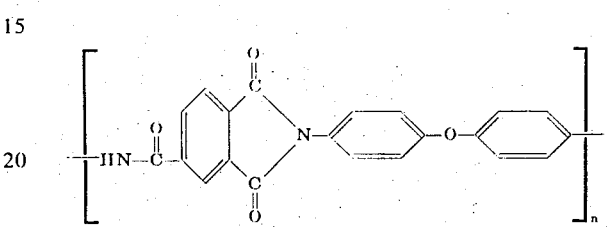

wherein $R_3$ is an oxy radical the resin provides films having particularly good thermal life.

The soluble polyamide precursors for the above trivalent derived polyamide-imide resins may be generically described as aromatic polyamic or polyamide acids and include in repeating form one or both of the structures:

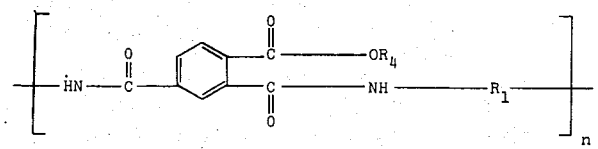

and

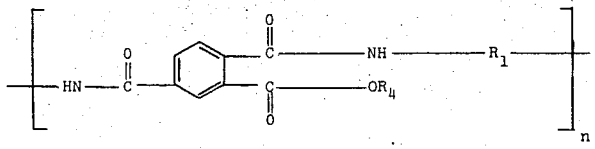

wherein $R_1$ and n are identical to the description hereinabove and $R_4$ is selected from the group consisting of $-H$, alkyl or aryl radicals. For details on the preparation of these soluble polyamic acids and the solid resins therefrom, reference may be had to British Pat. Nos. 1,056,564 and 1,032,649.

The same solvents as previously described can be used for the above aromatic polyamic acids.

In accordance with this invention, the solvent solution of aromatic polyamic acid is deposited as a single wet layer by dipping, brushing, or spraying, but preferably by casting as a thin, wet, precursor film, using a film spreader or other suitable means, on one or both sides of a suitable solid substrate, such as glass or metal foil. The wet layer is then initially heated in a tower or oven, with or without vacuum, at temperatures between about 80° and 110°C, up to about 3 hours, preferably between about 5 minutes to 1½ hours and at a relative humidity preferably below 60 percent, to eliminate or drive off a large percentage of solvent and water (reducing the volatiles from about 82 percent to about 20-35 percent) and forming a tack free film-substrate composite. During this step the precursor film is restrained by adhesion to the substrate, there being no shrinkage in its width or length (area) although its thickness decreases substantially. It is thought that the initial removal of sufficient solvent at the lower temperatures, where the imidization rate is slow, retards degradation reactions which could occur at the higher temperatures of final cure. These degradation reactions are known to be hydrolysis by water of imidization and also attach of the amic acid linkages by both amine or anhydride groups. Initial heating below 110°C also helps to eliminate bubbles in the finally cured film caused by air and solvent entrapment.

I found that air circulation during drying was at times detrimental. Solvent laden films exposed to the air for various intervals picked up moisture depending upon the relative humidity. In some cases the extent of damage varied from turning the films opaque, to serious crazing and cracking. High air velocities produced a mottled or orange-peel effect. Initial cure above 60 percent relative humidity can allow the solvent, which acts as a desiccant, to draw water into the film, allowing possible polymer chain breakage with resulting brittle film properties.

After initial heating, the film is cured at temperatures between about 130° and 350°C to drive off all the remaining solvent or solvents and cure the precursor layer to a solid polyamide-imide high temperature stable film. Preferably this is done in a non-air circulating tower or oven without any initial air curing.

Simultaneous with final cure, the film should be stretched up to 150 percent, or preferably from 5 to 125 percent of its original length or width by any suitable film stretching means, such as for example, using weights, increasing the rpm of a lead roller drawing the film through the curing ovens while maintaining the speed of the other rollers to stretch in the longitudinal direction and by using a suitable center frame which stretches the film in the transverse (width) direction.

The film should be dried to about 3-25 percent volatiles (solvent plus some water) before the elongation step by a semi-cure at about 130° to 270°C between about 5 minutes and 2 hours in order to enable the film to be stripped from the substrate. The semi-cured stripped film will generally be about 2-10 mils thick. The final cure elongation step may then be carried out at temperatures between about 200° and 350°C, but preferably between about 250° and 325°C.

This type film possesses not only electrical and organic thermoplastic properties but also mechanical thermoset properties. It has stiff linear polymer chains but will degrade before its melting point is reached. The stretching must be timed to the curing reaction of the film, and accomplished quickly while some volatiles are still present.

The fold endurance of the film can be improved over non-elongated film by a factor of 5 in the direction of stretch, and by a factor of 2 in the crosswise direction, by the stretching step described above. The stretching step also tends to improve elongation, tensile strength, electric strength and breakdown voltage of the stretched film over non-stretched film. The stretching at the time of final cure apparently decreases the amount of amorphous material in the film. The molecules become more oriented, possibly up to about 5 percent, but not sufficiently so to cause a definite crystalline structure. Upon being stretched the film samples generally become visibly opaque. As a final step the cured film is cooled and then removed from the oven.

EXAMPLE 1

A polyamic acid precursor solution was formed by condensation of pyromellitic dianhydride with 4,4'-diaminophenyl ether and 3,4'-diaminobenzanilide in the weight proportion 20:19:1 in dimethylacetamide as solvent, to give a solution having a solids content of about 18 percent at a Z-3 Gardner Holt viscosity at 25°C.

EXAMPLE 2

A polyamic acid precursor solution was obtained by dissolving a solid polyamic or polyamide acid derived from equimolar quantities of 4-acid chloride or trimellitic anhydride and 4,4'-diaminodiphenylmethane (methylenedianiline) in dimethylacetamide solvent, to give a solution having a solids content of about 30 percent at a Gardner Holt viscosity of V at 25°C. The powder had a molecular weight of about 10,000.

EXAMPLE 3

The polyamic acid precursor solution of EXAMPLE 2, was cast in a single pass onto aluminum foil strips using a film coater having a wet gap setting of 15 mils. Thirty-four samples were prepared for comparative purposes using different drying methods to produce amide-imide films having thickness ranges of from 2.0 to 2.9 mils. None of these samples were stretched.

Of the group of 34 samples, samples 1 to 10 were air dried for 12 hours prior to initial heating while samples 10 to 25 were initially heated in a 100°C oven with no prior air drying. As indicated in Table 1, these samples were cured at 150°C, 150° and 200°C; and 150° and 250°C and stripped from the foil for a comparison of properties. Tensile strength and percent elongation at break (25°C) of the stripped solid amide-imide film samples were obtained, according to the specifications of A.S.T.M. 882-54T and are shown below in Table 1:

TABLE 1

NON-STRETCHED
AMIDE-IMIDE FILM
Tensile Strength and % Elongation At Break

Initially Air Dried

| 100°C | 1 HR. | 100°C | 1 HR. |
| 150°C | 1 HR. | 150°C | 1 HR. |
|  |  | 200°C | 1 HR. |

| Sample | Tensile psi | Elongation % | Sample | Tensile psi | Elongation % |
| --- | --- | --- | --- | --- | --- |
| 1 | 11,400 | 6.8 | 6 | 12,800 | 6.9 |
| 2 | 11,200 | 5.3 | 7 | 13,300 | 8.2 |
| 3 | 12,200 | 10.1 | 8 | 13,200 | 8.3 |
| 4 | 11,900 | 7.9 | 9 | 14,100 | 10.4 |
| 5 | 12,200 | 10.4 | 10 | 12,600 | 8.0 |
| Avg. | 11,824 | 8.1 |  | 13,200 | 8.3 |

Not Initially Air Dried

| 100°C | 1 HR. | 100°C | 1 HR. |

TABLE 1-Continued

NON-STRETCHED AMIDE-IMIDE FILM
Tensile Strength and % Elongation At Break

Initially Air Dried

| | 150°C | 1 HR. | | 150°C 200°C | 1 HR. 1 HR. |
|---|---|---|---|---|---|
| Sample | Tensile psi | Elongation % | Sample | Tensile psi | Elongation % |
| 11 | 8,760 | 4.6 | 16 | 13,500 | 9.9 |
| 12 | 9,230 | 4.1 | 17 | 12,500 | 7.1 |
| 13 | 8,230 | 3.6 | 18 | 14,600 | 32.7 |
| 14 | 10,200 | 7.2 | 19 | 12,000 | 5.9 |
| 15 | 10,200 | 5.6 | 20 | 14,500 | 16.4 |
| Avg. | 9,324 | 5.0 | | 13,422 | 14.4 |

| | 100°C | 1 HR. |
|---|---|---|
| | 150°C | 1 HR |
| | 250°C | 1 HR. |

| Sample | Tensile psi | Elongation % |
|---|---|---|
| 21 | 11,800 | 6.0 |
| 22 | 12,170 | 18.2 |
| 23 | 14,000 | 8.6 |
| 24 | 13,110 | 6.0 |
| 25 | 15,370 | 15.6 |
| | 13,300 Avg. | 10.9 Avg. |

Maximum tensile strength and % elongation at break were obtained when the solid amide-imide films were not initially air dried and were cured to at least 200°C.

Samples 26 to 28 were initially air dried for 12 hours prior to initial cure while samples 29 to 31 were heated in a 100°C oven with no initial air drying. The samples were finally cured at 150° and 225°C and stripped from the foil. The dielectric strength of these samples was measured. The technique used employed a curved electrode set up. The top cylindrical electrode fit into a bottom concave electrode. The cylindrical electrode was 2 inches long with a 5/16 inch diameter. The film samples were placed between the electrodes and a voltage applied at a rate of 500 volts/second until breakdown. Table 2 shows the results of these tests:

TABLE 2

NON-STRETCHED AMIDE-IMIDE FILM
Dielectric Strength V/M (Curved Electrode)

Initially Air Dried

| | 100°C | 1 Hr. | |
|---|---|---|---|
| | 150°C | 1 Hr. | |
| | 225°C | 1 Hr. | |
| Sample | Thickness (Mils) | KV | V/M |
| 26 | 2.9 | 4.3 | 1480 |
| 27 | 2.3 | 4.8 | 2800 |
| 28 | 2.4 | 6.3 | 2620 |
| | | | 2300 Avg. |

TABLE 2-Continued

NON-STRETCHED AMIDE-IMIDE FILM
Dielectric Strength V/M (Curved Electrode)

Not Initially Air Dried

| | 100°C | 1 Hr. | |
|---|---|---|---|
| | 150°C | 1 Hr. | |
| | 225°C | 1 Hr. | |
| Sample | Thickness (Mils) | KV | V/M |

Initially Air Dried

| 29 | 2.8 | 6.0 | 2140 |
| 30 | 2.8 | 8.2 | 2920 |
| 31 | 2.8 | 6.7 | 2390 |
| | | | 2480 Avg. |

Samples 32 to 34 were initially heated in a 100°C oven with no initial air drying. The samples were cured at from 200°C to 250°C and stripped from the foil. The samples were cut ½ × 6 inches and tested in a Tinius-Olsen Folding Endurance Tester according to the specifications of A.S.T.M. 2176-63T. Table 3 shows the results of these tests:

TABLE 3

NON-STRETCHED AMIDE-IMIDE FILM
Fold Endurance (cycles)

Not Initially Air Dried

| Sample | Cure 1 Hr. | 1 Hr. | 1 Hr. | Thickness (mils) | No. of Fold Endurance Cycles |
|---|---|---|---|---|---|
| 32 | 100°C | 150°C | 200°C | 2.3 | 3,214 |
| 33 | 100°C | 150°C | 225°C | 2.1 | 9,355 |
| 34 | 100°C | 150°C | 250°C | 2.0 | 9,540 |

EXAMPLE 4

The polyamic acid precursor solution of EXAMPLE 2 was deposited onto long, 5 mil thick aluminum foil in a single pass using a film coater having a wet gap setting of 15 mils. Six samples were not air dried prior to initial heating. All samples were initially heated for 1 hour at 100°C to a volatile content between about 25 to 35 percent volatiles and were cured for 1 hour at 150°C., to dry the film to a tack free state having a volatile content between about 7 to 25 percent volatiles. The film samples were then hand stripped from the foil and final cured for ¼ hour at 225°C. Various weights, found on Table 4, were evenly hung on the bottom of the stripped films before they entered the 225°C oven. When the films reached 225°C they were stretched by the weights. One stripped control sample was left without weights. All samples were cooled prior to removal from the oven. Film sizes, weights, thicknesses, % stretch and fold endurance, using a Tinius-Olsen Folding Endurance Tester, according to the specifications of A.S.T.M. 2176-63T are shown in Table 4:

TABLE 4

STRETCHED AMIDE-IMIDE FILM
Properties of Stretched Film

| Sample | Size Inches | Thickness Initial Mils | Wt. lb. | Temp. Cure To °C | Stretch Inches | Thickness (Stretched) Mils | Appearance | % Stretch | No. of Fold Endurance (Cycles) |
|---|---|---|---|---|---|---|---|---|---|
| 35 | 2 × 4 | 2.3 | 1 | 225 | 3.25 | 1.4 | Opaque | 81 | 24,560 |
| 36 | 6 × 12 | 2.3 | 3 | 225 | 15.0 | 1.3 | Opaque | 125 | 18,663* 13,224** |
| 37 | 6 × 12 | 2.3 | 2 | 225 | 14.0 | 1.3 | Opaque | 116 | 24,364 |
| 38 Control | 3 × 12 | 1.5 | None | 225 | None | 1.5 | Clear | 0 | 6,534 |
| 39 | 6 × 12 | 2.3 | 3 | 225 | 15 | 1.3 | Opaque | 125 | |
| 40 | 4 × 4 | 2.8 | 2 | 225 | 1.0 | 1.4 | Clear | 25 | 22,712 |

\* longitudinal
\*\* transverse

Sample 37 was then cut into strips (37a–e) and tested for tensile strength and % elongation at break, to observe any changes in the property after stretching. The results of this test are shown in Table 5:

TABLE 5

STRETCHED AMIDE-IMIDE FILM
Not Initially Air Dried

| 100°C | 1 Hr. |
| 150°C | 1 Hr. |
| 225°C | ¼ Hr. |

| Sample | Tensile psi | % Elongation at Break |
|---|---|---|
| 37a | 18,460 | 31.25 |
| 37b | 17,230 | 25.00 |
| 37c | 17,380 | 25.00 |
| 37d | 16,310 | 18.75 |
| e | 15,850 | 21.38 |
| | 17,046 Avg. | 24.38 Avg. |

Sample 39 was cut into strips (39a–e) and tested for electric strength using a ¼ inch diameter electrode. The rate of rise was 500 volts/second and was applied until breakdown occurred. The results are shown in Table 6:

TABLE 6

STRETCHED AMIDE-IMIDE FILM
Electrical Strength of Film
(¼" dia. Electrode, 500 volts per sec.)

Not Initially Air Dried

| 100°C | 1 Hr. |
| 150°C | 1 Hr. |
| 225°C | ¼ Hr. |

| Sample | KV | Thickness Mils | V/M |
|---|---|---|---|
| 37a | 5.6 | 1.3 | 4300 |
| 39b | 5.6 | 1.3 | 4300 |
| 39c | 5.4 | 1.3 | 4150 |
| 39d | 5.6 | 1.3 | 4300 |
| 39e | 5.6 | 1.3 | 4300 |
| | 5.56 Avg. | 1.3 Avg. | 4270 Avg. |

The purpose of this EXAMPLE was to stretch the solid amide-imide films in one direction in order to examine the effect of possible orientation on their physical and electrical properties.

Stretching the films at 225°C did not produce any well defined crystallization according to X-ray defraction measurements. However, it did show a reduction in the amount of amorphous material. Stretching the film at final cure temperatures caused sufficient orientation of the molecules to result in improved physical properties. Excellent fold endurance was achieved at 25 and 125 percent stretch, and it is felt that stretching the film between 0.5 and 150 percent of its original length would provide marked fold endurance in the films. Above 150 percent stretch would tend to cause the film to become too thin for practical insulation applications.

The first visual effect of orientation occurred when the stretched film turned from clear to opaque. This generally happened at approximately 80 percent stretch. As can be seen from a comparison of similar samples (except for stretching) of Table 3 and Table 4, fold endurance of stretched samples 35, 36, 37 and 40 were 3 to 5 times better than non-stretched samples 32, 33 and 34. The non-stretched control sample 38 confirms the fact that the longer curing or additional thickness of Table 3 samples was not detrimental and does not account for the difference in physical properties.

The stretched film also showed an increase in tensile strength and % elongation at break over non-stretched film under similar conditions (Table 1, unstretched samples 16, 17, 18, 19 and 20 vs. Table 5, stretched samples 37a–e), where stretched samples were significantly better than non-stretched samples in tensile strength and almost 2 times better than unstretched samples in % elongation at break. The same may be said for stretched samples tested for electric strength (Table 2, unstretched samples 29, 30 and 31 vs. Table 6, stretched samples 39a–e), where stretched samples were almost 2 times better than unstretched samples in breakdown voltage per mil, although thickness for the stretched samples was somewhat less.

Several samples cast in one pass from the precursor solution of EXAMPLE 2 were finally cured to 300°C. These samples tended to lose their edge tear resistance and turned from yellow to dark amber. The maximum temperature used successfully to initially heat the films before final cure without bubbles was between 100°–110°C. Although initial temperatures up to 175°C were tried without degrading the polymer excessively, bubbles due to air and solvent entrapment strated to form whenever initial heating temperatures exceeded 100°C.

I claim as my invention:

1. A method of producing a resinous insulating film in a single pass by:

I. depositing a solvent solution of a soluble polyamide precursor onto a solid substrate, the soluble polyamide precursor being selected from the group consisting of precursors having the structure:

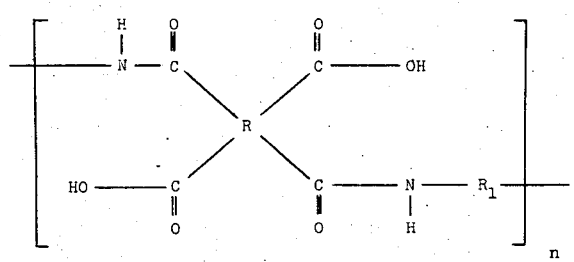

and

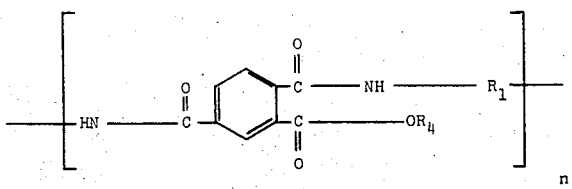

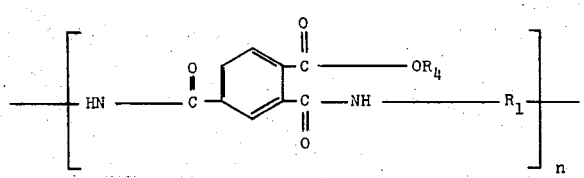

wherein $n$ is at least 15, R is at least one tetravalent organic radical selected from the group consisting of:

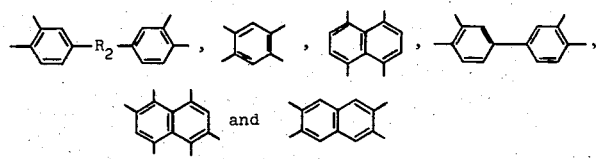

$R_2$ being selected from the group consisting of divalent aliphatic hydrocarbon radicals having from one to four carbon atoms and carbonyl, oxy, sulfo and sulfonyl radicals, $R_1$ is at least one divalent radical selected from the group consisting of:

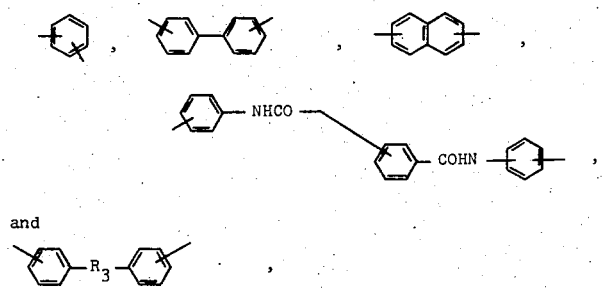

in which $R_3$ is a divalent organic radical selected from the group consisting of $R_2$, silico and amido radicals and in which $R_4$ is selected from the group consisting of: -H, alkyl and aryl radicals, directly followed by, II. heating the solvent solution at temperatures between about 80° and 110°C, between about 5 minutes to 3 hours, to partically remove solvent and form a film-substrate composite the substrate being effective to restrain film shrinkage in the width and length directions, directly followed by, III. heating the film-substrate composite at a temperature of at least 130°C, to semi-cure the film, so that the film contains about 3 to 25 percent volatiles, directly followed by, IV. stripping the semi-cured film containing about 3 to 25 percent volatiles from the substrate, directly followed by, V. stretching the semi-cured film containing about 3 to 25 percent volatiles between about 0.5 and 150 percent at temperatures between about 200° and 350°C, to simultaneously finally cure the film to remove all of the solvent and to provide a solid, cured, stretched insulating film.

2. The method of claim 1 wherein the solvent solution is deposited as a single layer, the heating in step (III) is between about 130° and 270°C and the film is stretched in step (V)
   at between about 250° and 325°C and then finally cured at up to 350°C.

3. The method of claim 1 wherein the solvent solution is deposited as a single layer, the film is heated in step (II) in an atmosphere having a relative humidity of up to about 60 percent, and the film is stretched in step (V) between about 5 and 125 percent of its original length.

4. The method of claim 1 wherein the heating in step (II) is up to 1½ hours, so that the film contains about 20 to 35 percent volatiles, the heating in step (III) is between about 5 minutes and 2 hours and the semi-cured film is from about 2 to 10 mils thick.

5. The method of claim 2 wherein the solvent comprises a solvent selected from the group consisting of dimethyl acetamide, dimethyl formamide, N-methyl pyrrolidone, dimethyl sulfoxide, pyridine and mixtures thereof.

6. The method of claim 2 wherein the soluble polyamide precursor is selected from the group consisting of precursors having the structure:

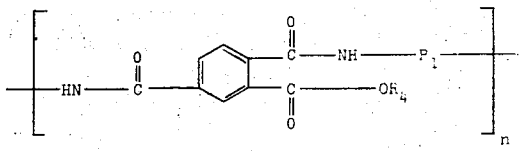

and

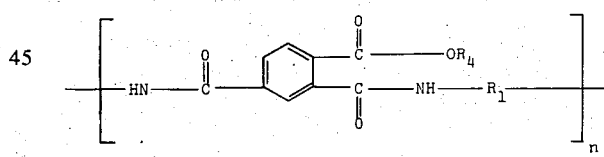

wherein $R_1$ is

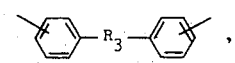

$R_3$ is selected from the group consisting of oxy and methylene radicals and $R_4$ is a -H radical.

7. The method of claim 6 wherein $R_3$ is an oxy radical.

8. The method of claim 6 wherein $R_3$ is a methylene radical.

9. A method of producing a resinous insulating film in a single pass by;

I. depositing a solvent solution of a soluble polyamide precursor onto a solid substrate, the soluble polyamide precursor being selected from the group consisting of precursors having the structure:

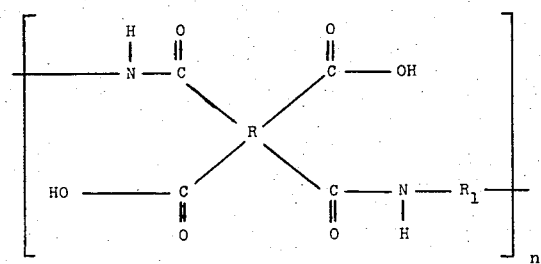

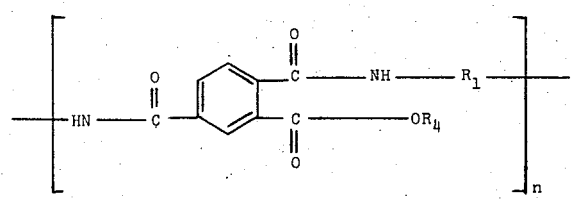

and

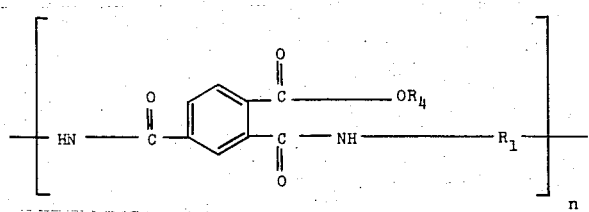

wherein n is at least 15, R is at least one tetravalent organic radical selected from the group consisting of:

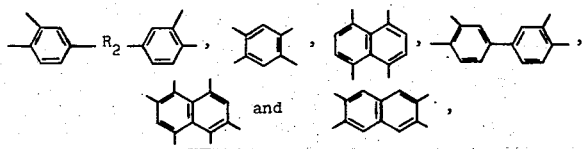

$R_2$ being selected from the group consisting of divalent aliphatic hydrocarbon radicals having from 1 to 4 carbon atoms and carbonyl, oxy, sulfo and sulfonyl radicals, $R_1$ is at least one divalent radical selected from the group consisting of:

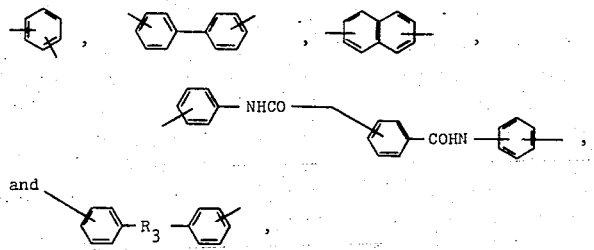

in which $R_3$ is a divalent organic radical selected from the group consisting of $R_2$, silico and amido radicals and in which $R_4$ is selected from the group consisting of: —H, alkyl and aryl radicals, directly followed by, II. heating the solvent solution at temperatures between about 80° and 110°C, between about 5 minutes to 3 hours, to partially remove solvent and form a film-substrate composite the substrate being effective to restrain film shrinkage in the width and length directions, directly followed by, III. heating the film-substrate composite at a temperature of between about 130° to 270°C between about 5 minutes and 2 hours to semi-cure the film, so that the film contains about 3 to 25 percent volatiles, directly followed by, IV. stripping the semi-cured film containing about 3 to 25 percent volatiles from the substrate, and finally, V. stretching the semi-cured film containing about 3 to 25 percent volatiles between about 0.5 and 150 percent at temperatures between about 200° and 350°C, to simultaneously finally cure the film to remove all of the solvent and to provide a solid, cured, stretched insulating film.

10. The method of claim 9 wherein the solvent comprises a solvent selected from the group consisting of dimethyl acetamide, dimethyl formamide, N-methyl pyrrolidone, dimethyl sulfoxide, pyridine and mixtures thereof, the solvent solution is heated in a non-circulating air oven and the substrate is selected from the group consisting of glass and metal foil.

11. The method of claim 9 wherein the soluble polyamide precursor is selected from the group consisting of precursors having the structure:

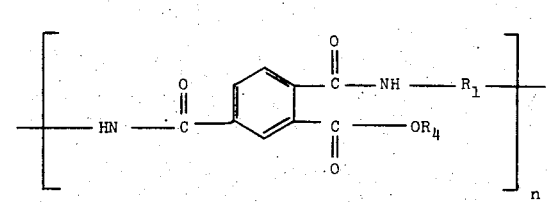

and

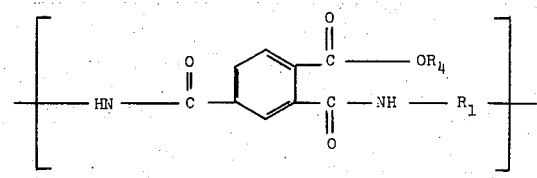

wherein $R_1$ is

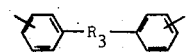

$R_3$ is selected from the group consisting of oxy and methylene radicals and $R_4$ is a —H radical.

12. The method of claim 11 wherein $R_3$ is an oxy radical.

13. The method of claim 11 wherein $R_3$ is a methylene radical.

* * * * *